(12) United States Patent
Bell et al.

(10) Patent No.: US 9,387,785 B2
(45) Date of Patent: Jul. 12, 2016

(54) VEHICLE SEAT HAVING A HEAD REST ARRANGEMENT WITH AN ADJUSTABLE HEAD CUSHION AND METHOD OF MANUFACTURING THE VEHICLE SEAT

(75) Inventors: Anders Bell, Fjärås (SE); Peter Setterberg, Partille (SE); Veronica Gustafsson, Mölnlycke (SE)

(73) Assignee: Volvo Car Corporation, Göteborg (SE)

( * ) Notice: Subject to any disclaimer, the term of this patent is extended or adjusted under 35 U.S.C. 154(b) by 550 days.

(21) Appl. No.: 13/533,474

(22) Filed: Jun. 26, 2012

(65) Prior Publication Data
US 2013/0001989 A1 Jan. 3, 2013

(30) Foreign Application Priority Data
Jul. 1, 2011 (EP) .................................. 11172386

(51) Int. Cl.
*B60N 2/48* (2006.01)
*B60N 2/42* (2006.01)
*B60R 21/055* (2006.01)

(52) U.S. Cl.
CPC ............ *B60N 2/4829* (2013.01); *B60N 2/4249* (2013.01); *B60N 2/4838* (2013.01); *B60R 21/055* (2013.01); *Y10T 29/49826* (2015.01)

(58) Field of Classification Search
CPC .. B60N 2/4885; B60N 2/4829; B60N 2/4249; B60N 2/4838; B60R 21/055
USPC ............................................ 297/216.12, 410
See application file for complete search history.

(56) References Cited

U.S. PATENT DOCUMENTS

| | | | |
|---|---|---|---|
| 3,655,241 A | | 4/1972 | Herzer et al. |
| 3,813,151 A | * | 5/1974 | Cadiou .......................... 297/410 |
| 5,772,280 A | * | 6/1998 | Massara ................... 297/216.12 |
| 6,199,900 B1 | | 3/2001 | Zeigler |
| 6,523,902 B2 | * | 2/2003 | Robinson ...................... 297/410 |
| 6,550,856 B1 | * | 4/2003 | Ganser et al. ......... 297/216.12 X |
| 6,616,235 B1 | * | 9/2003 | Khavari et al. ................ 297/410 |
| 7,618,091 B2 | * | 11/2009 | Akaike et al. ............ 297/216.12 |
| 2005/0253440 A1 | * | 11/2005 | Kotani et al. .................. 297/410 |
| 2006/0226689 A1 | | 10/2006 | Linnenbrink et al. |
| 2008/0246323 A1 | | 10/2008 | Kuno |
| 2011/0316318 A1 | * | 12/2011 | Yamaguchi et al. ...... 297/410 X |

FOREIGN PATENT DOCUMENTS

| | | |
|---|---|---|
| EP | 0819570 A2 | 1/1998 |
| EP | 1138548 A1 | 10/2001 |
| EP | 1724148 A1 | 11/2006 |

OTHER PUBLICATIONS

ISA European Patent Office, Extended European Search Report of EP11172386, Dec. 21, 2011, Netherlands, 5 pages.

* cited by examiner

*Primary Examiner* — Anthony D Barfield
(74) *Attorney, Agent, or Firm* — Alleman Hall McCoy Russell & Tuttle LLP

(57) ABSTRACT

An example of the present description relates to a vehicle seat comprising a back rest support comprising a head rest arrangement. The head rest arrangement comprises a displaceable head cushion which is displaceable between a first and a second position along a Z-axis. The head rest arrangement further comprises a passenger protection part adapted to protect a passenger from injury during a collision. The displaceable head cushion is displaceably arranged with respect to the passenger protection part. The present description provides for comfort and safety for passengers in a vehicle for both front passengers and back passengers.

17 Claims, 6 Drawing Sheets

VEHICLE SEAT HAVING A HEAD REST ARRANGEMENT WITH AN ADJUSTABLE HEAD CUSHION AND METHOD OF MANUFACTURING THE VEHICLE SEAT

RELATED APPLICATIONS

The present application claims priority to European Patent Application No. 11172386.2, filed on Jul. 1, 2011, the entire contents of which are hereby incorporated by reference.

TECHNICAL FIELD

The present description relates to a vehicle seat having a head rest arrangement with a displaceable head cushion. The vehicle seat comprises a passenger protection member to protect a passenger during a collision, for example. The present description also relates to method for manufacturing the vehicle seat.

BACKGROUND

When a vehicle collides, such as an automobile colliding with another automobile, the imparted force on the passengers can have consequences in the form of injuries on the passengers. A common scenario is when a back passenger sitting in a rear seat of the vehicle, is thrown into a front seat of the vehicle, due to the rapid deceleration of the vehicle during a collision, for example. As the passengers have an amount of inertia, travelling with the same speed as the vehicle before the rapid deceleration, an unbuckled passenger can literally fly into the back side of a front seat in a vehicle. Other common injuries during a collision are neck injuries, sometimes referred to as whiplash injuries. When designing and developing head rests for vehicle seats these potentially lethal traffic injuries need to be addressed. One step towards reducing the effects of such accidents during collisions was taken by Volvo when Volvo introduced the head rest on their vehicle seats as early as 1968.

Adjustable head rests of vehicle seats tend to be thick, due to the components required for the adjustment mechanism, and can potentially obstruct a driver when driving the vehicle. One traffic situation when this problem may be realized is when a driver of a vehicle, such as an automobile, will overtake another automobile. Before switching lane, a driver needs to look through the rear view mirror, side view mirror and subsequently turn his or her head and check the blind spot of the side view mirror before safely switching lane. However, adjustable head rests can obstruct the driver's view of the blind spot. There is thus also a need for vehicle seats with thin, or slim, adjustable head rests arrangements.

In the patent publication US patent No. 2006/0226689 A1, an adjustable head rests is disclosed. The angular position of the head rest can be adjusted using a mechanism comprising of two holding brackets plugged into holding receptacles. The holding receptacles are formed in rotatable bodies, thus enabling the angular positioning. The head rest has an adjustable cushion body, which position along a Z-axis, e.g. in the vertical direction with respect to the vehicle, can be adjusted by sliding the cushion body along the two holding brackets by means of a motor. The motor is arranged inside the sliding cushion.

SUMMARY

It is an object of the present description to provide for an improved vehicle seat having a head rest arrangement, or at least a useful alternative. It is also an object of the present description to provide for a vehicle seat comprising a head rest arrangement which can provide comfort while providing safety for the passengers in the vehicle. The objects of the present description are met by providing a vehicle seat comprising a back rest support comprising a head rest arrangement. The head rest arrangement comprises a displaceable head cushion, the displaceable head cushion being displaceable between a first and a second position along a Z-axis. The head rest arrangement comprises a passenger protection part adapted to protect a passenger from injury during a collision, and in that the displaceable head cushion is displaceably arranged with respect to the passenger protection part.

The present description provides for a vehicle seat with a back rest support comprising a head rest arrangement which is comfortable while still providing a high level of safety to both front and rear passengers of the vehicle during a collision, for example. If the vehicle is an automobile, the vehicle seat according to the present description is advantageously used as a front vehicle seat as there tends to be stricter safety requirements for front vehicle seats.

According to an aspect of the description, the head rest arrangement is adapted to be pivotally arranged to the back rest support of the vehicle seat. As such, both the head cushion and the passenger protection part can be pivoted with respect to the back rest support of the vehicle seat. This enables the head cushion of the head rest arrangement to be positioned at a wide variety of different positions, providing safety and comfort to different passengers during use of the vehicle.

According to an aspect of the description, the head cushion is displaceably arranged to a displacement section inside of the passenger protection part. The displacement section is adapted to enable the head cushion to be displaced between the first and second position, by providing a continuous displacement section or a stepwise displacement section for example. An example of a continuous displacement section enables the head cushion to be displaced in a continuous manner, while a stepwise displacement section enables the head cushion to be displaced step wise between predetermined positions. By way of a non-limiting example, the slide section can be provided by a first and a second holding bracket or a first and a second tube part, along which the head cushion can be slideably connected. It is also within the boundaries that only one holding bracket or tube part is used.

According to an aspect of the description, the head rest arrangement is pivotally arranged at a pivot axis. The passenger protection part further comprises a second section or displacement support section; the second section or displacement support section is arranged between the pivot axis and the displacement section of the passenger protection part. In an example, the second section or displacement support section is distinctly separated from the displacement section. The displacement section and the support section can be provided by a support structure which provides structural integrity to each section. By way of a non-limiting example, the support structure can comprise holding brackets, metal tubes, metal bars (solid or hollow) or the like. The passenger protection part can be arranged to the support structure by attaching form moulded material for example to the support structure.

According to an aspect of the description, the displacement section is a slide section and the head cushion is adapted to slide on the slide section to enable the displacement of the head cushion. The head cushion of course comprises at least one attachment member, or attachment means, to provide for a slideable connection to the slide section.

According to an aspect of the description, the slide section and the second section or displacement support section is parted by at least one stop flange, or stop member. The at least one stop flange, or stop member, limits the head cushion from being displaced to the second section or displacement support section. In an example, a part of the second section or displacement support section provides for the stop flange. Optionally a stop flange, or stop member, can be provided by a separate component attached either to the displacement section or the second section, or in cases of a support structure, the displacement section or the second section the support structure.

To enable the head cushion to be automatically displaced, either upon a signal representing a preprogrammed or predetermined position or upon a manually initiated signal, the second section or displacement support section can be adapted to be a section with means for displacing the head cushion, a motor carrying section comprising a motor for example. The motor carrying section is arranged between the pivot axis of the head rest arrangement, and the displacement section of the passenger protection part. This provides for a displacement section separate from the second section carrying the means for displacing the head cushion, in this example a motor carrying section. According to an aspect of the description, the head cushion is displaceable with respect to the motor of the motor carrying section. More particularly, the head rest arrangement of the vehicle seat provides for a thin appearance, which will reduce the area blocked to the driver of the vehicle when looking across his or hers shoulder to view the dead angle for example.

According to an aspect of the description, the passenger protection part is in the form of a protective housing. The protective housing can be manufactured from form- or jet moulded parts using thermoplastic polymers such as polyethylene, polypropylene polyurethane, the like or combinations thereof.

According to an aspect of the description, the protective housing substantially encloses the displacement section and the second section of the head rest arrangement. The protective housing at least covers the support structure.

According to an aspect of the description, the head cushion comprises a first and a second side, the first side of the head cushion is adapted to receive the head of a passenger sitting on the vehicle seat, and the second side of the head cushion is facing towards the protection part.

According to an aspect of the description, the protective housing can be manufactured from multiple parts. In an example, the protective housing comprises a first and a second protective member. The first protective member is positioned away from the head cushion, and the second protective member is positioned to face towards the head cushion and in the near vicinity thereof, or advantageously, directly adjacent to the head cushion.

According to an aspect of the description, the head rest arrangement is pivotally arranged to the back rest of the vehicle seat to enable the head rest arrangement to be displaced between a first and a second position along an X-axis, the X-axis is substantially perpendicular to the Z-axis.

According to an aspect of the description, the protection part of the head rest arrangement is limited from displacement along the Z-axis and with respect to the back rest support of the vehicle seat.

According to a second aspect of the description, the description relates to a vehicle seat comprising back rest support comprising a pivotable head rest arrangement. The pivotable head rest arrangement comprises a displaceable head cushion. The displaceable head cushion is displaceable between a first and a second position along a Z-axis. The pivotable head rest arrangement comprises a fixed passenger protection part adapted to protect a passenger from injury during a collision, and the displaceable head cushion is displaceably arranged with respect to the passenger protection part.

According to another aspect of the description, the description relates to a method for manufacturing vehicle seat with a head rest arrangement. The method comprises the steps of providing a support structure for the head rest arrangement. The support structure has a displacement section and a second section or displacement support section. The displacement section is adapted to be connected with a displaceable head cushion. The method comprises the steps of; attaching a protection part to the support structure so that the support structure is substantially enclosed. The protection part is adapted to protect a passenger from injury during a collision and; attaching the displaceable head cushion to the displacement section so that the displaceable head cushion can be displaced with respect to protection part.

The method provides for a head rest arrangement which is slim in design, thus not obstructing the blind spot for a driver, safe, and which is comfortable.

According to an aspect of the description, the protection part comprises a first and a second protection member, and the method comprises the step of; attaching the first and second protection members to the support structure, so that the support structure is substantially enclosed.

According to an aspect of the description, the second section or displacement support section is adapted to be connected with a motor, the method comprises the step of; attaching a motor to the second section or displacement support section before the protection part is attached to the support structure.

According to an aspect of the description, the method comprises the step of pivotally connecting the head rest arrangement to a back rest support of a vehicle seat, thereby forming a vehicle seat having a pivotable head rest arrangement with an adjustable head cushion.

According to an aspect of the description, the description relates to a head rest arrangement for a vehicle seat as disclosed herein, and a method for manufacturing a head rest arrangement as disclosed herein.

The present description may provide several advantages. In particular, the approach may improve a driver's comfort and safety while driving a vehicle. Further, the approach may reduce a driver's blind spot when the driver seeks to change driving lanes. Further still, the approach provides for an aesthetically pleasing vehicle safety feature. engine emissions after the engine reaches warmed up operating conditions by allowing the engine to retard combustion phasing while continuing to provide stable combustion.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Examples of the present description will be described in greater detail with reference to the accompanying figures in which.

DETAILED DESCRIPTION

Figure 1A:
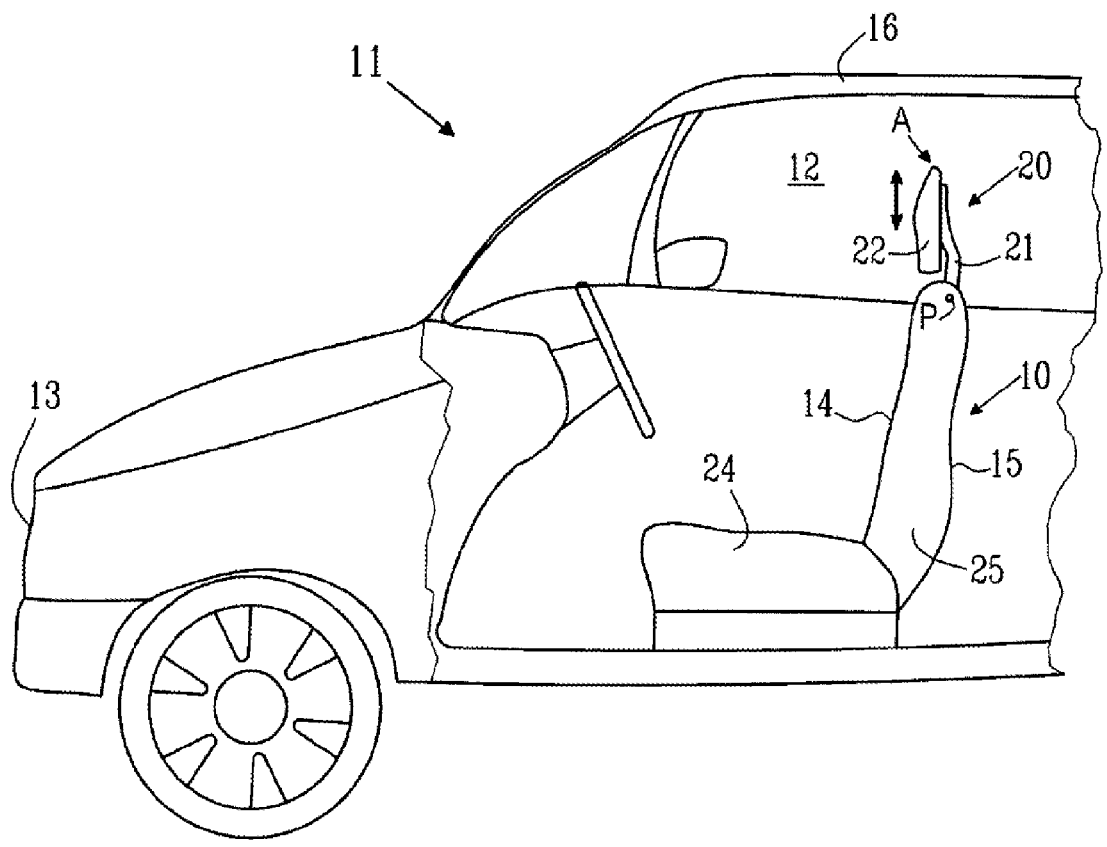
FIGS. 1a-1c show a vehicle seat, parts of a vehicle having a head rest arrangement with an adjustable head cushion.
Figure 1A:
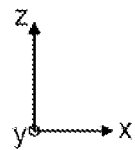
Figure 1B:
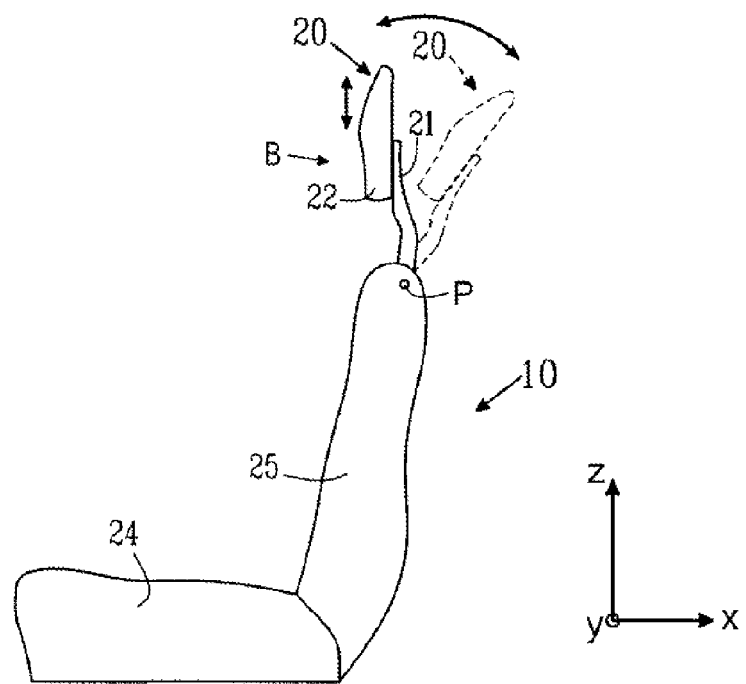
Figure 1C:
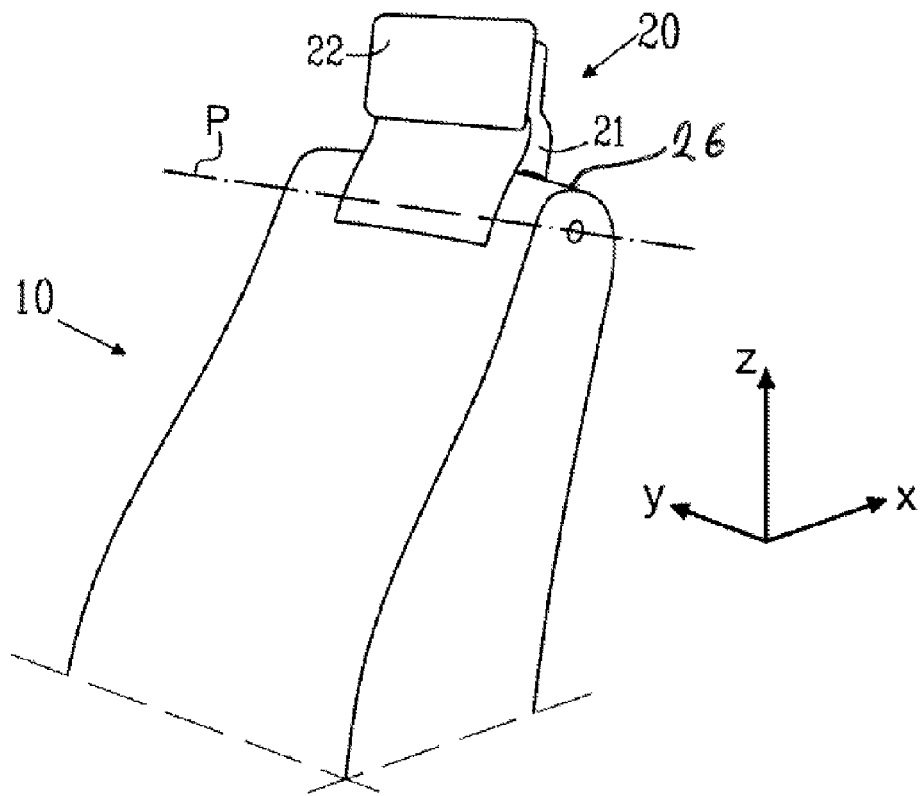
Figure 2A:
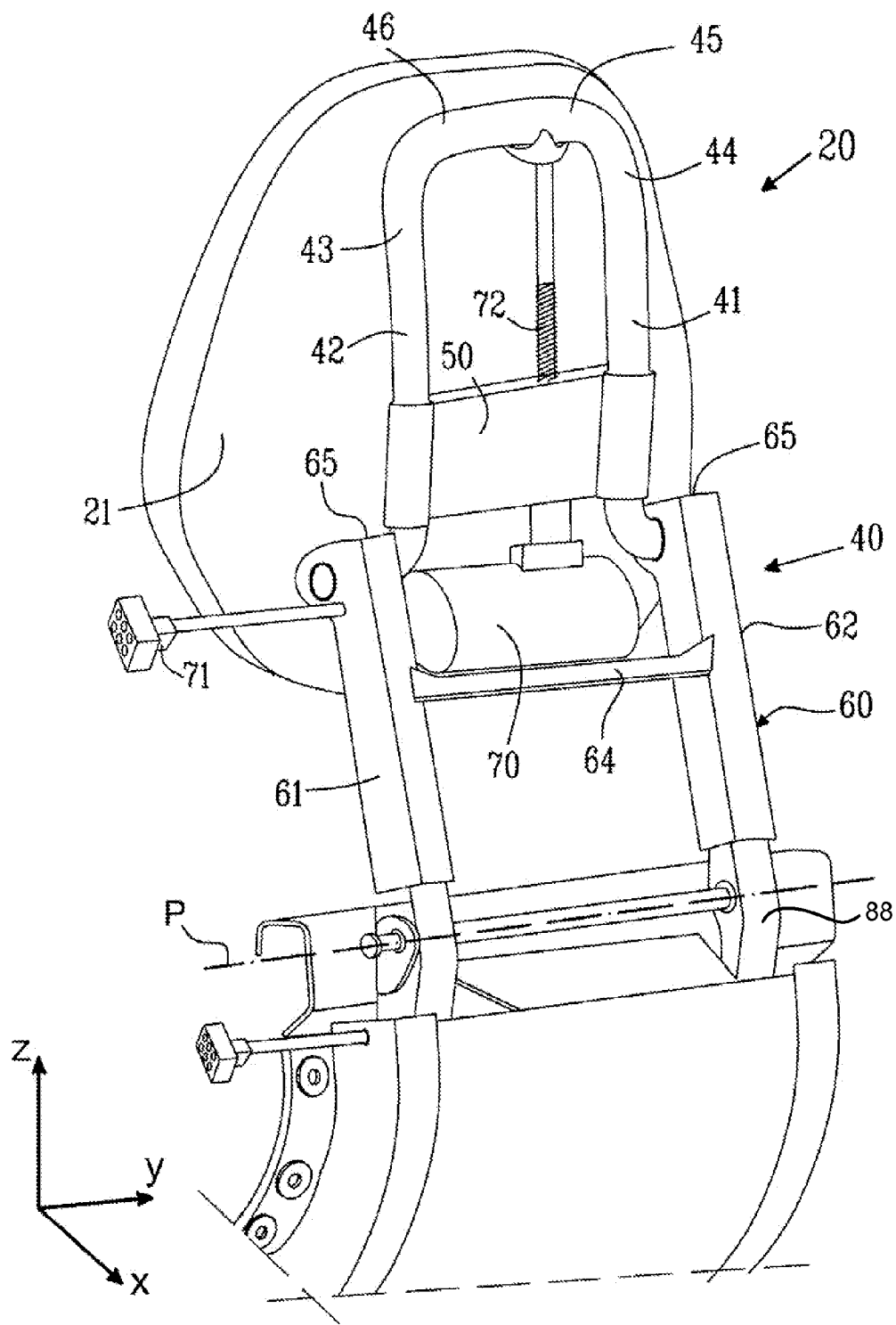
FIGS. 2a-2c shows with a view in perspective the support structure of the head rest arrangement of the vehicle seat shown in FIGS. 1a-1c.
Figure 2B:
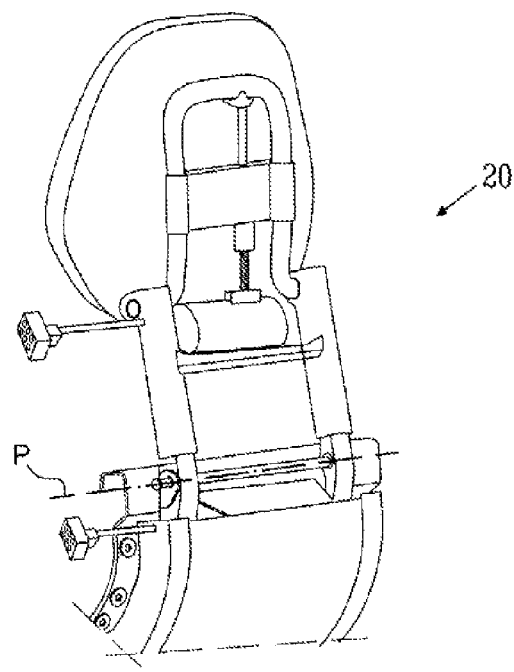
Figure 2C:
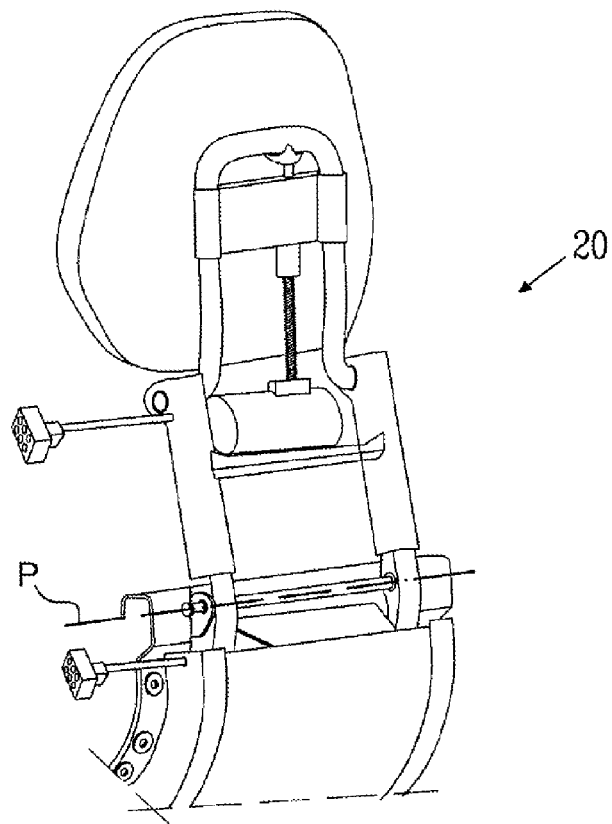
Figure 3:
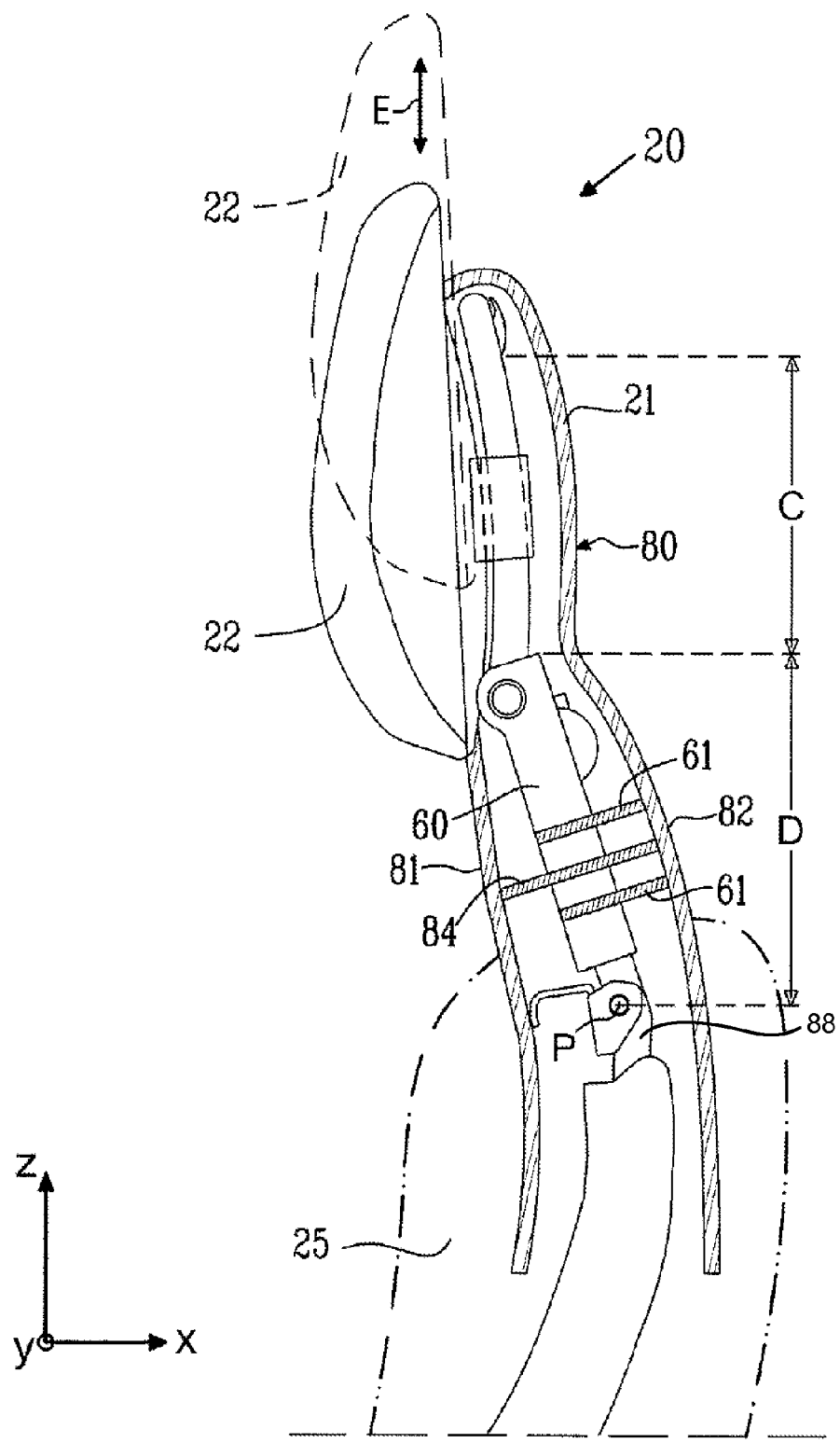
FIG. 3 shows the head rest arrangement as seen from the side, with a protection part in the form of a protective housing shown with a cross section.
Figure 4:
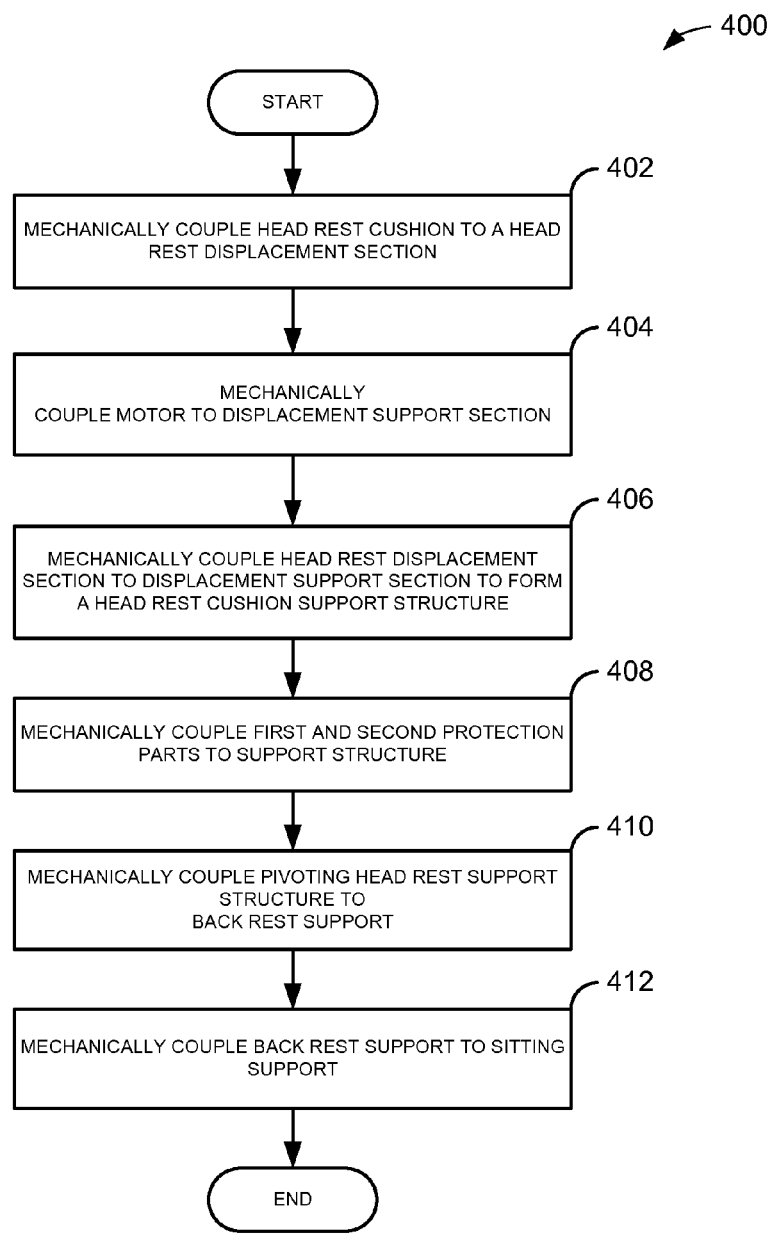
FIG. 4 shows a flowchart of an example method for manufacturing a seat.

The present description is related to seating for a vehicle. FIGS. 1a-1c show different views of a seat according to the present description. An example of the seat and some of its internal components are shown in FIGS. 2a-2c. FIG. 3 shows an example cross sectional view of the seat and its internal components. Finally, FIG. 4 shows a flowchart of an example method for manufacturing a seat.

FIG. 1a shows a vehicle seat 10 for a vehicle 11 having a passenger compartment 12 partly delimited by a roof 16. The vehicle seat 10 is in FIG. 1 positioned at the steering position of the vehicle 11, i.e. at the front of the passengers compartment 12 of the vehicle 11 facing forward towards the front 13 of the vehicle 11. The vehicle seat 10 has a front facing side 14, facing towards the front 13 of the vehicle 11, and a rear facing side 15, the rear facing side 15 facing towards the rear (not shown) of the vehicle 11. The vehicle can be provided with front passengers and rear passengers. A front passenger is a passenger sitting in the vehicle seat 10 while a rear passenger is a passenger sitting behind the vehicle seat 10, rearward of the vehicle seat 10. The vehicle seat according to the present description is specifically suitable as a front vehicle seat, although it can be used as rear vehicle seats as well.

The vehicle seat 10 comprises a head rest arrangement 20, adapted to protect and to provide comfort to a passenger sitting in the vehicle seat 10. The head rest arrangement 20 comprises a protection part 21 and a displaceable head cushion 22. The head cushion 22 is displaceably arranged to the protection part 21 between a first and a second position A, B, as shown in FIGS. 1a-1b, enabling the position of the head cushion 20 to be displaced along a Z axis. The displacement of the head cushion 22 is illustrated with an arrow in FIGS. 1a-1b.

The vehicle seat 10 comprises a sitting support 24, in this case in the form of a seat cushion, and a back rest support 25, in this case the form of a back rest cushion. The back rest support 25 is pivotally arranged to the sitting support 24 to enable the back rest support 25 to be pivotally adjusted with respect to the sitting support 24.

As used herein, the Z axis corresponds to the height of the vehicle 11, an X-axis corresponds to the length of the vehicle 11, and a Y-axis corresponds to the width of the vehicle 11, as shown in FIG. 1b. When the term "up" or "upper" is used to indicate a position or a direction, it is intended to mean towards the roof of the vehicle during normal use of the vehicle.

The protection part 21 is adapted to protect passengers from injury during a collision or a fast deceleration of the vehicle 11. During a collision, a passenger positioned behind, or rearward, of the vehicle seat 10 can be propelled, or displaced due to the inertia of the passenger's body weight, into the rear facing side 15 of the vehicle seat 10, and thus the head rest arrangement 20. The protection part 21 protects the rear passenger from injury imposed by impact on the head rest arrangement of the vehicle seat 10, and the mechanism by which the head cushion can be displaced by. Such adjustment mechanisms generally tend to be manufactured from metal elements and are thus usually very rigid. The protection part 21 is thus generally manufactured from a material which is suitable to protect a passenger from serious injury, while at the same time be strong enough not to impose a danger to the passenger sitting in the actual vehicle seat. Optionally, the head rest arrangement comprises a support structure to impose rigidity, and a protective material attached thereto.

The head rest arrangement 20 is, in the shown example, further pivotally arranged to the back rest support 25 of the vehicle seat 10 at a pivot axis P, via a pivot connection. The pivot connection enables the head rest arrangement 20, and thus the head rest cushion 22, to be displaced between a first and a second position along the X-axis, to enable a passenger to sit comfortably. The position of the head rest arrangement 20 after displacement in the direction of the X-axis is shown in FIG. 1b with dashed lines. As is noticed, the pivot axis P of the head rest arrangement 20 is arranged slightly below an upper end 26 of the back rest 25 of the vehicle seat 10. This enables the pivot mechanism to be positioned further into the back rest support 25 of the vehicle seat 10 were more space is available, while at the same time enable a comfortable positioning of the head cushion 22 of the head rest arrangement 20.

Referring now to FIGS. 2a-2c, component parts of the head rest arrangement 20 are shown in greater detail with a view in perspective and from the rear side of the head rest arrangement 20. FIGS. 2a-2c show the rear side of the displaceable head cushion 21. The head rest arrangement 20 comprises a support structure 40 adapted to carry the weight and to provide structural integrity to the head rest arrangement 20. The support structure is coupled to seat back 88. The support structure 40 comprises a displacement section 41 which is arranged in working cooperation with the head cushion 22 to enable the displacement of the head cushion 22 between a first position, as shown in FIG. 2a, and a second position, as shown in FIG. 2c. FIG. 2b shows the head cushion 22 positioned in a middle, or center, position.

The displacement section 41 is in the shown example a slide section 42. The displacement section can be said to provide for a structure for the head cushion to be displaced on. The slide section comprises a first and a second tube section 43, 44, or tube part, formed by a substantially U-formed tube element 45. A slide connection 50 connects the head cushion 22 with the slide section 42, and more precisely with the first and the second tube sections 43, 44. The slide connection 50 extends between the first and the second tube sections 43, 44 of the slide section 42. It is further firmly connected to the head cushion 22 e.g. by screws, to provide stability and rigidity during the displacement of the head cushion 22.

The support structure 40 also comprises a second section or displacement support section 60, which also can be referred to as a support section. The second section or displacement support section 60 is positioned between the pivot axis P and the slide section 41. In the shown example, the second section or displacement support section 60 is a motor carrying section provided with a motor 70 to enable an automated displacement of the head cushion 22 of the head rest arrangement 20. This is advantageous as the head cushion is displaceable with respect to the motor 70 of the motor carrying section which provides for a slimmer, or thinner, head rest arrangement in the line of sight of e.g. a driver. A lever 71 for manual displacement via the motor 70 extends from the second section or displacement support section 60 and out from the back rest support 25 (not shown in FIG. 2a) of the vehicle seat 10. The displacement of the head cushion 22 can thus be implemented by both manual and automated means. The motor 70 can be powered by the electrical system of the vehicle in a known manner.

The second section, or the displacement support section, comprises a first and a second bar 61, 62 which extends from the proximity of the pivot connection with the back rest support 25 of the vehicle seat 10, and thus the pivot axis P. The first bar 61 of the second section 60, is connected to the first tube section 43 of the substantially U formed tube element 45, and likewise, the second bar 62 of the second section 60, is connected to the second tube section 44 of the substantially U formed tube element 45. A support bar 64 extends between the first and the second bar 62, 63 of the second section 60 of the support structure 40.

During operation, the motor 70 rotates a screw 72 which is connected to the slide connection 50 of the head cushion 22 via threads, so that upon rotating the screw 72, the position of the slide connection 50 and thus the head cushion 22 is changed. This is illustrated by the different positions of the head cushion 22 as shown in FIGS. 2a-2c. The screw 72 is further rotatably connected to an upper end 46 of the substantially formed tube element 45.

The second section 60 and the slide section 42 of the head rest arrangement 20 are fixed with respect to each other. By having a displacement section, in this case a slide section 42, separate with respect to a second section or displacement support section 60, in this case a motor carrying section, rigidity can be built into the support structure 40 of the head rest arrangement 20. It provides for a slim appearance of the head rest arrangement as the head cushion displacement means can be arranged in, or to, the second section. It also enables the protection part 21 to be attached to the support structure 40, if desired.

FIG. 3 shows the head rest arrangement 20 and a cross section of the protection part 21. The protection part 21 can be attached to the second section 60 using screws 61 or snap on connections. The protection part 21 could also be connected to the upper end 46 of the substantially U-tube firmed tube element 45.

The protection part 21 forms a protective housing 80 around the support structure 40, and thus parts of the head rest arrangement 20. The protective housing 80 can be manufactured using form, injection, or jet moulding using thermoplastic polymers such as polyethylene, polypropylene polyurethane, the like or combinations thereof.

The protective housing 80 can be formed by a first and a second protection member 81, 82, arranged on opposite sides of the support structure 40. Optionally, the first and the second protection members 81, 82 are adapted to be connected to each other, as illustrated by the connection member 84 in FIG. 3, so as to retain the first and the second connection members 81, 82 to each other and to the support structure 40 of the head rest arrangement 20. By having the motor carrying section between the displacement section 41, in this case a slide section 42, and the pivot axis P, the protective housing 80, and in more general terms, the protection part 21, can be fitted very closely to the displacement section 41, as is shown in FIG. 3 in a schematic way with the cross section of the protective housing 80. This enables the head cushion to be manufactured with a slim form, i.e. a relatively short extension along the X-axis, and a very slim upper end of the head rest arrangement 20. The head rest arrangement 20 will not severely block the vision of a driver or a passenger to any significant extent who looks across his or her shoulder to check a blind spot. It is believed that this may increase the safety in at least some traffic situations. In FIG. 3, the slide section 42 and the second section or displacement support section 60 are indicated by the arrows C and D. The second section 60 is shown mechanically coupled to seat back 88.

The displacement of the head cushion 22 with respect to the protection part 21, formed by the protective housing 80 in FIG. 3, is illustrated by means of the dashed lines in FIG. 3 and the arrow F.

Referring now to FIG. 4, a method to manufacture a seat is shown. Method 400 begins at 402 where a head rest cushion is mechanically coupled to a head rest displacement section. The head rest cushion may be comprised of memory foam or other material so as to support a person's head. Method 400 proceeds to 404 after the head rest cushion is mechanically coupled to the head rest displacement section.

At 404, method 400 mechanically couples a motor to a displacement support section. The motor may rotate a screw to adjust a position of the head rest. Method 400 proceeds to 406 after the motor is coupled to the displacement support section.

At 406, method 400 mechanically couples the head rest displacement section to the displacement support section to form a head rest cushion support structure. The head rest cushion support structure may provide protection to both a seat occupant and an occupant positioned directly behind the seat. The displacement section may pivot about the displacement support section. Method 400 proceeds to 408 after the head rest cushion support structure is formed.

At 408, method 400 mechanically couples first and second protection parts to the support structure to at least partially enclose the support structure. Further, the first and second protection parts may cover or fit inside of a back rest support to further enclose the support structure within the protection parts. In some examples, a single support part may partially enclose the support structure. Method 400 proceeds to 410 after the protection parts are coupled to the support structure.

At 410, method 400 mechanically couples the pivoting head rest support structure to the seat hack rest support. In one example, fasteners such as rivets or bolts may be used to couple the pivoting head rest support structure to the seat hack rest support. Method 400 proceeds to 412 after the head rest support structure is coupled to the back rest support.

At 412, method 400 mechanically couples the back rest support to a sitting support to form the seat. The back rest support section may be coupled to the sitting to support via rivets, bolts, screws, or other fastener. Method 400 exits after the back rest support is coupled to the sitting support.

As will be appreciated by one of ordinary skill in the art, the elements of the method described in FIG. 4 may be performed in the sequence illustrated, in parallel, or in some cases omitted. Likewise, the order of executing the method is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed to manufacture a seat.

The invention claimed is:

1. A vehicle seat, comprising:
 a back rest support;
 a head rest arrangement pivotally coupled to the back rest support, the head rest arrangement comprising:
  a displaceable head cushion, the displaceable head cushion being displaceable between a first and a second position along a Z-axis; and
  a passenger protection part for protecting a passenger from injury during a collision, and where the displaceable head cushion is displaceably arranged with respect to the passenger protection part, wherein both the displaceable head cushion and the passenger protection part are pivotally coupled to the back rest support at a pivot axis, wherein the displaceable head cushion is displaceably arranged to a support structure comprising a displacement section inside of the passenger protection part, and wherein the displacement section includes a slide section comprising a substantially U-formed tube element.

2. The vehicle seat of claim 1, where the displacement section includes at least two positions, the at least two positions allowing the displaceable head cushion to be displaced between the at least two positions.

3. The vehicle seat of claim 2, where the support structure further comprises a displacement support section, the displacement support section being arranged between the pivot axis and the displacement section of the passenger protection part.

4. The vehicle seat of claim 3, where the slide section and the displacement support section are parted by at least one stop flange, or stop member, the at least one stop flange, or stop member, limiting the displaceable head cushion from being displaced to the displacement support section.

5. The vehicle seat of claim 3, where the displaceable head cushion is coupled to the slide section, and where the slide section slides on the displacement section to enable displacement of the displaceable head cushion.

6. The vehicle seat of claim 3, where the displacement support section includes a motor carrying section, the motor carrying section being arranged between the pivot axis and the displacement section of the passenger protection part, and where the motor carrying section is for enabling an automated displacement of the displaceable head cushion.

7. The vehicle seat of claim 6, where the motor carrying section comprises a motor to enable the automated displacement of the displaceable head cushion.

8. The vehicle seat of claim 7, where the passenger protection part is in the form of a protective housing.

9. The vehicle seat of claim 8, where the protective housing encloses at least a portion of the displacement section and the displacement support section.

10. The vehicle seat of claim 9, where the displaceable head cushion comprises a first and a second side, the first side of the displaceable head cushion arranged to receive a head of a passenger sitting on the vehicle seat, and the second side of the displaceable head cushion facing towards the passenger protection part.

11. The vehicle seat of claim 9, where the protective housing comprises a first and a second protective member, the first protective member being positioned away from the displaceable head cushion, and the second protective member being positioned to face toward the displaceable head cushion.

12. The vehicle seat of claim 11, where the head rest arrangement is pivotally coupled to the back rest support of the vehicle seat to enable the head rest arrangement to be displaced between a first and a second position along an X-axis, the X-axis being perpendicular to the Z-axis.

13. The vehicle seat of claim 12, where the passenger protection part of the head rest arrangement is limited from displacement along the Z-axis and with respect to the back rest support of the vehicle seat.

14. The vehicle seat of claim 5, wherein the displacement support section comprises first and second bars which each extend from a proximity of the pivot axis, the first and second bars each connected to the slide section and having a support bar extending therebetween.

15. The vehicle seat of claim 1, wherein the passenger protection part is adapted to protect a passenger sitting behind the vehicle seat.

16. A vehicle seat having a pivotable head rest arrangement, the pivotable head rest arrangement configured to pivot relative to a back rest support of the vehicle seat, the pivotable head rest arrangement comprising a displaceable head cushion, the displaceable head cushion being displaceable between a first and a second position along a Z-axis, where the pivotable head rest arrangement comprises a fixed passenger protection part for protecting a passenger from injury during a collision, where the displaceable head cushion is displaceably arranged with respect to the passenger protection part, where both the displaceable head cushion and the passenger protection part are pivotally coupled to the back rest support at a pivot axis, and where the displaceable head cushion comprises a first and a second side, the first side of the displaceable head cushion arranged to receive a head of a passenger sitting on the vehicle seat, and the second side of the displaceable head cushion facing towards the passenger protection part.

17. A vehicle seat, comprising:
a back rest support;
a head rest arrangement pivotally coupled to the back rest support, the head rest arrangement comprising:
 a displaceable head cushion, the displaceable head cushion being displaceable between a first and a second position along a Z-axis; and
 a passenger protection part for protecting a passenger from injury during a collision, and where the displaceable head cushion is displaceably arranged with respect to the passenger protection part,
wherein both the displaceable head cushion and the passenger protection part are pivotally coupled to the back rest support at a pivot axis,
wherein the passenger protection part is in the form of a protective housing, and
wherein the protective housing comprises a first and a second protective member, the first protective member being positioned away from the displaceable head cushion, and the second protective member being positioned to face toward the displaceable head cushion.

* * * * *